United States Patent
Oesterling

(12) 
(10) Patent No.: US 7,062,376 B2
(45) Date of Patent: Jun. 13, 2006

(54) METHOD AND SYSTEM FOR PROVIDING A CARPOOL SERVICE USING A TELEMATICS SYSTEM

(75) Inventor: Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/650,549

(22) Filed: Aug. 28, 2003

(65) Prior Publication Data

US 2005/0049781 A1     Mar. 3, 2005

(51) Int. Cl.
*G01C 21/26* (2006.01)

(52) U.S. Cl. .......................................... 701/207; 705/5
(58) Field of Classification Search ........ 701/200–202, 701/207, 213–214; 705/5, 9, 14
See application file for complete search history.

(56) References Cited

U.S. PATENT DOCUMENTS

| 6,697,730 B1 * | 2/2004 | Dickerson ................... 701/200 |
| 2001/0056363 A1 * | 12/2001 | Gantz et al. ................... 705/9 |
| 2004/0049424 A1 * | 3/2004 | Murray et al. ................. 705/14 |

* cited by examiner

*Primary Examiner*—Yonel Beaulieu
(74) *Attorney, Agent, or Firm*—Cardinal Law Group

(57) ABSTRACT

The invention provides a method and system for providing car-pooling assistance using a wireless communication system. The method includes steps for receiving a user carpool enrollment request, obtaining the positional information of the user's moving vehicle, storing the positional information as a route in a call center database and sending at least one available match based on the carpool enrollment request to the user.

18 Claims, 2 Drawing Sheets

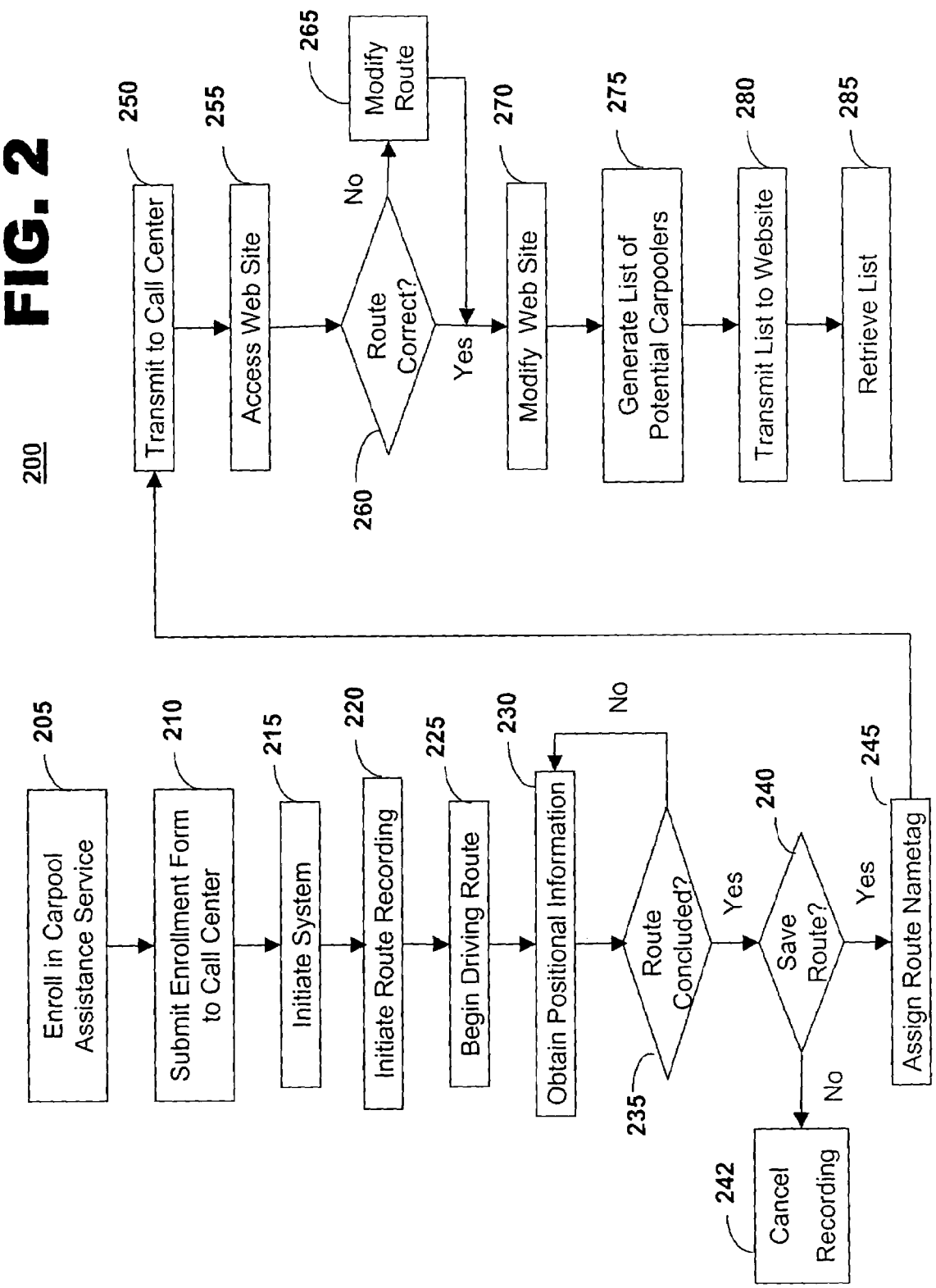

METHOD AND SYSTEM FOR PROVIDING A CARPOOL SERVICE USING A TELEMATICS SYSTEM

FIELD OF THE INVENTION

This invention relates generally to data transmission over a wireless communication system. More specifically, the invention relates to a method and system for providing carpool service to wireless communication device users.

BACKGROUND OF THE INVENTION

Wireless communication services for mobile vehicles, such as navigation and roadside assistance, have increased rapidly in recent years. Global Positioning System (GPS) satellite technology has played an important part in these services. With the aid of GPS technology, the position of a vehicle may be determined at any time.

A substantial portion of any driver's time is spent on frequently traveled routes, such as the driver's daily commute to work or school. Often, the route to work or school is traveled using roads with heavy traffic. The periods of heavy traffic usually coincide with a person's daily commute. In many communities there has been a concerted effort to reduce the number of vehicles on the road during peak travel times. These efforts largely consist of encouraging commuters to carpool. What is lacking in many of these efforts is an organized efficient system of bringing together potential carpoolers leading to no reduction of the number of vehicles on the road. A better system for linking carpoolers together would alleviate some of the congestion that occurs during normal commuting hours. More importantly, reducing the number of vehicles on the road leads to a reduction of exhaust pollutants that are harmful to the environment.

Therefore, it would be desirable to provide a method and system for uploading of vehicle routes for carpool assistance that overcomes the aforementioned and other disadvantages.

SUMMARY OF THE INVENTION

One aspect of the invention provides a method for providing car-pooling assistance using a wireless communication system. The method includes steps for receiving a user carpool enrollment request, obtaining the positional information of the user's moving vehicle, storing the positional information as a route in a call center database and sending at least one available match based on the carpool enrollment request to the user.

Another aspect of the invention provides a computer usable medium including a program for providing car-pooling assistance using a wireless communication system. The program may include computer program code for receiving a user carpool enrollment request, computer program code for obtaining the positional information of the user's moving vehicle, computer program code for storing the positional information as a route in a call center database and computer program code for sending at least one available match based on the carpool enrollment request to the user.

Another aspect of the invention provides a system including means for receiving a user carpool enrollment request, means for obtaining the positional information of the user's moving vehicle, means for storing the positional information as a route in a call center database and means for sending at least one available match based on the carpool enrollment request to the user.

The aforementioned, and other features and advantages of the invention, will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of one embodiment of a method providing car-pooling assistance using a wireless communication system, in accordance with the current invention.

DETAILED DESCRIPTION OF THE PRESENTLY PREFERRED EMBODIMENTS

Figure 1:
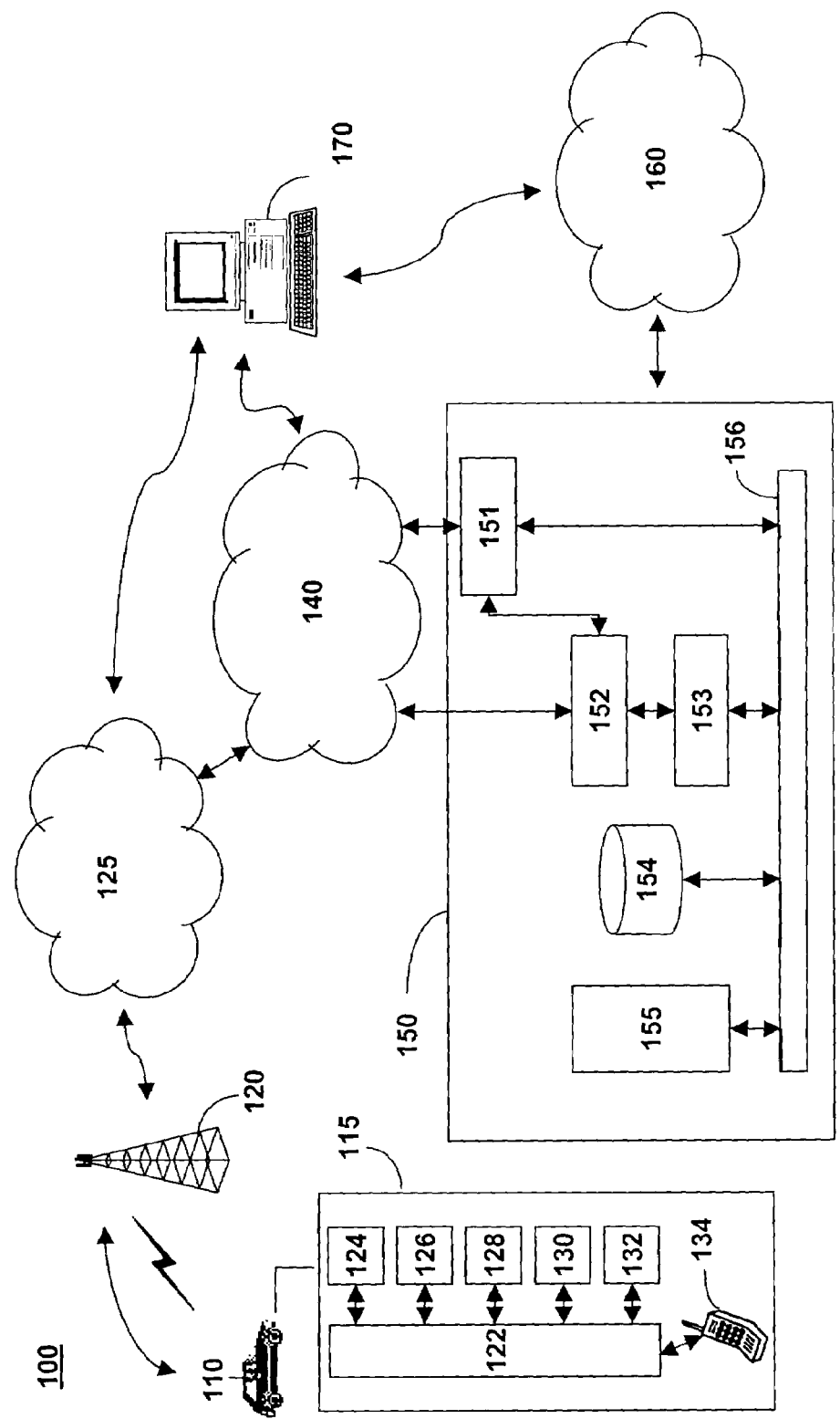
FIG. 1 is an illustration of one embodiment of a system for providing car-pooling assistance using a wireless communication system, in accordance with the current invention.

FIG. 1 shows an illustration of one embodiment of a system for providing car-pooling assistance using a wireless communication system, in accordance with the present invention at 100.

Carpool assistance system 100 may contain one or more mobile vehicles 110, one or more wireless carrier systems 120, one or more communication networks 125, one or more land networks 140, and one or more call centers 150. Call center 150 may contain one or more switches 151, one or more data transmission devices 152, one or more communication services managers 153, one or more communication services databases 154, one or more advisors 155, and one or more bus systems 156. Call center 150 provides information to Web site 160.

Carpool assistance system 100 may also include one or more client, personal or user computers 170. Communication network 125 may connect wireless carrier system 120 to user computer 170 and call center 150.

Client, personal or user computer 170 includes a computer usable medium that executes Internet browser and Internet-access computer programs to send and receive data over communication network 125 to call center 150. User computer 170 sends a message with attached location information through a web-page interface using communication standards such as hypertext transport protocol (HTTP) and transport-control protocol and Internet protocol (TCP/IP).

Mobile vehicle 110 includes a telematics unit 115. Telematics unit 115 may include a digital signal processor (DSP) 122 connected to a wireless modem 124, a global positioning system (GPS) receiver or GPS unit 126, an in-vehicle memory 128, a microphone 130, one or more speakers 132, and wireless vehicle communication device 134. DSP 122 may also be referred to as a microcontroller, controller, host processor, or vehicle communications processor. In-vehicle phone 134 may be an analog, digital, dual-mode, dual-band, multi-mode or multi-band cellular phone.

The wireless vehicle communication device 134 may be an embedded or in-vehicle phone, such as an analog or digital phone, with suitable hardware and software for transmitting and receiving data communications. Mobile vehicle 110 may contain a wireless modem 124 for transmitting and receiving data. The data may represent a real-time recording of a traveled route.

Global positioning system unit 126 is capable of determining synchronized time and a geophysical location of the mobile vehicle. The GPS unit 126 provides longitude and latitude coordinates of the vehicle. The GPS unit 126 may be the source of positional information for the vehicle that is obtained at set time intervals. Other sources of the positional information may be location technologies such as time difference of arrival (TDOA), angle of arrival (AOA), cell of origin (COO), location pattern matching, or visual landmark recognition. Global positioning system unit 126 also provides coordinated date and time information for a recorded route traveled. In one embodiment, the GPS unit 126 time and date stamps the route information as the user travels the route to be recorded. In another embodiment, the GPS unit 126 time stamps the route to be recorded. The date and/or time stamp provides additional information for the route to be recorded and used for the carpooling service.

DSP 122 executes various computer programs and computer program code that control programming and operational modes of electronic and mechanical systems within telematics unit 115. DSP 122 controls communications between telematics unit 115, wireless carrier system 120, and call center 150. A voice-recognition application may be installed in DSP 122 that can translate human voice input through microphone 130 to digital signals. For example, programming of in-vehicle phone 134 may be controlled with verbal commands that are translated by voice-recognition software executed by DSP 122. Alternatively, buttons on an interface of telematics unit 115 or in-vehicle phone 134 may be used to change a phone number and other phone configuration settings. The interface to telematics unit 115 may include one or more buttons on the telematics unit, radio console, or associated keyboard or keypad. The interface to telematics unit 115 may include other forms of preference and data entry including touch-screens, wired or wireless keypad remotes, or other wirelessly connected devices such as Bluetooth-enabled devices.

DSP 122 may activate various programming and operation modes, as well as provide for data transfers. Signals from DSP 122 may be translated into voice messages and sent out through speaker 132. One of the generated voice messages may include instructions given when a user has requested and entered a programming mode of in-vehicle phone 134.

Mobile vehicle 110 via telematics unit 115 may send and receive radio transmissions from wireless carrier system 120. Wireless carrier system 120 may be any suitable system for transmitting a signal from mobile vehicle 110 to communication network 125.

Mobile vehicle 110 includes a digital signal processor (DSP) with software and additional hardware to enable communications with the mobile vehicle and to perform other routines and requested services. In one embodiment, the DSP includes a routine for obtaining and recording positional and date/time information from the GPS unit for a route traveled by the vehicle. Mobile vehicle 110 may have the capability of saving this positional and date/time information to flash memory or RAM or another appropriate onboard system well known in the art.

Mobile vehicle 110 may send radio transmissions to and receive radio transmissions from wireless carrier system 120. Wireless carrier system 120 may be a wireless communications carrier. Wireless carrier system 120 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 125.

Communications network 125 may comprise a mobile switching center. Communications network 125 may comprise services from one or more wireless communications companies. Communications network 125 may be any suitable system or collection of systems for connecting wireless carrier system 120 to a second mobile vehicle 110 or to a call center 150.

Land network 140 may be a public-switched telephone network. Land network 140 may comprise a wired network, an optical network, a fiber network, another wireless network, or any combination thereof. Land network 140 may comprise an Internet protocol (IP) network. Land network 140 may connect communications network 125 to a call center.

Land network 140, in one embodiment, connects a first wireless carrier system 120 with a second wireless carrier system 120. Communication network 125 and land network 140 may connect wireless carrier system 120 to a communication node or call center 150. The communication delivered to the call center may be, for example, a recording of positional information for a route traveled by the vehicle. The communication may be delivered to call center 150 by vehicle 110 initiating a call to a predetermined number.

Call center 150 may be a location where many calls may be received and serviced at the same time, or where many calls may be sent at the same time. The call center may be a telematics call center, prescribing communications to and from mobile vehicles 110. The call center may be a voice call center, providing verbal communications between an advisor in the call center and a subscriber in a mobile vehicle. The call center may contain each of these functions. Call center 150 includes hardware and software necessary for providing subscriber carpooling service. The hardware and software includes that which enables the storing of carpool subscriber enrollment information and the comparing of one subscriber's enrollment information to another subscriber's enrollment information in order to provide carpool candidates.

The call center 150 may contain switch 151. Switch 151 may be connected to land network 140 and may receive a modem signal from an analog modem or from a digital modem. Switch 151 may transmit voice or data transmission from a communication node. Switch 151 may also receive voice or data transmissions from mobile vehicle 110 through wireless carrier system 120, communications network 125, and land network 140. Switch 151 may receive from or send data transmissions to data transmission device 152. Switch 151 may receive from or send voice transmissions to advisor 155 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, and any other device connected to bus system 156. Data transmission device 152 may convey information received from communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile vehicle 110 and between call center 150 and Web site 160.

Communication services manager 153 may receive information from mobile vehicle 110 through wireless carrier system 120, communication network 125, land network 140, and data transmission device 152. Communication services manager 153 may send information to mobile vehicle 110 through data transmission device 152, land network 140, communication network 125, and wireless carrier system 120. Communication services manager 153 may provide information to mobile vehicle 110 from communication services database 154.

Communication services database 154 may contain records on one or more mobile vehicles 110. Communication services database 154 may be a central storage location for information received from mobile vehicles 110. Records in communication services database 154 may include vehicle identification, location information, status information, recorded positional and date/time information for a route traveled by the vehicle, and recent action information regarding mobile vehicle 110. Communication services database 154 also provides storage for carpool service enrollment information. In one embodiment, the enrollment information is received from the service subscriber through web site 160. Communication services database 154 may provide information and other support to communication services manager 153.

Advisor 155 may be a real advisor or a virtual advisor. A real advisor may be a human being in verbal communication with the mobile communication device of vehicle 110. A virtual advisor may be a synthesized voice interface responding to requests from the mobile communication device of vehicle 110. Advisor 155 may provide services to the mobile communication device of vehicle 110. Advisor 155 may communicate with communication services manager 153 or any other device connected to bus system 156. Advisor 155 may provide routing assistance and traffic reporting to mobile vehicle 110.

Call center 150 provides information to Web site 160. The information provided to Web site 160 may be recorded positional and date/time information for a route traveled by the vehicle. Web site 160 may display this information overlaid on a map. The recorded route displayed on Web site 160 may be capable of modification by an identified user. Modification may be accomplished with dynamic HTML (DHTML), a Java applet, a client-side image map, Active X control, a browser plug-in, or any suitable method. Web site 160 also allows a driver to initiate the request for carpooling service. Web site 160 further provides the interface for a user of the carpooling service to input additional information regarding driving habits, preferences for potential carpoolers as well as any other relevant data. In one embodiment, the interface takes the form of an on-line application questionnaire.

FIG. 2 shows a flow diagram of one embodiment of a method for recording a mobile vehicle route and providing car-pooling assistance using a wireless communication system, in accordance with the present invention at 200. Carpooling assistance method 200 comprises steps to record and save positional information for a traveled route, and enable an identified service subscriber to locate potential carpoolers who travel the same or similar recorded route.

In one embodiment, a vehicle driver subscribes to the carpool service by first enrolling with the service (Block 205). The subscriber enrolls with the service by accessing the carpool web site 160 via a personal computer 170.

The enrollment process may take the form of answering a series of questions presented, i.e. an enrollment application. The questions may pertain to the drivers driving habits and the normal route traveled. Additional questions may pertain to driver and passenger preferences and habits. Questions may pertain to, for example, smoking and music preferences and whether the driver has a habit of stopping for coffee on the way to work. Additional questions may pertain to gender, car type (make and model), number of seats in the car, place of employment or school, occupation, and time of day to and from work or school. Other questions may provide details of a more personal nature so that those looking to carpool may find someone with common interests or hobbies. Other questions may pertain to how far the driver is willing to deviate from his normal route in order to accommodate his passengers. Once the enrollment form has been completed, the user transmits the completed form to the call center via the website (Block 210). In one embodiment, the user simply clicks a "Submit" button present on the web site interface. After transmission of the enrollment information to call center 150, the information is placed in a subscriber profile located in communication services database 154.

After a vehicle driver has enrolled with the service, the driver may initiate the system shown in FIG. 1, (Block 215). In one embodiment, this is accomplished by the driver pressing a button inside the vehicle 110. The button activates the vehicle's onboard digital signal processor 122, of telematics unit 115 which may respond with an audible signal, for example "Ready". In another embodiment, the user may initiate the system by speaking a word or phrase. For example, the user may speak the word "Activate".

The driver then instructs the system to record a route (Block 220). To initiate a recording, the driver may issue a voice command, for example "Start recording route." The vehicle's onboard digital signal processor may give an audible response, for example "Recording route." The driver may then begin traveling the route that is to be recorded (Block 225.)

As the vehicle travels the route, positional information may be obtained at set time intervals (Block 230). The set time intervals may be 0.05, 0.1, 0.5, 1, 5, and up to 10 seconds. In one embodiment, the time interval is 1 second. Positional information may continue to be obtained until the route is concluded (Block 235). In one embodiment, a time stamp is associated with the positional information obtained. In one embodiment, a time stamp is associated with each major intersection encountered along the recorded route. The time stamp provides another parameter for selecting potential carpool occupants. In another embodiment, a date stamp is associated with the recorded route. For example, the date traveled is obtained at the start of recording the route.

In one embodiment, the recorded route is divided into nodes and vertices. The nodes represent intersections and the vertices represent road segments between the nodes. Data attributes associated with each node may include time of day and date the node is traversed. Other data attributes associated with the recorded route may include the speed traveled between the nodes and the length of time to travel the vertices between the nodes.

Once the driver has traveled the entire route, the driver may either save the route information (240) or cancel the recording (242). Saving the route information may include the driver again pressing the button used to initiate the system, whereupon the onboard digital signal processor may again respond with an audible signal, for example "Ready." The driver may then issue a voice command, for example "Save route." The driver may cancel the recording for a number of reasons. For example, the driver may cancel the route if he unexpectedly went off his normal route while traveling to work due to a road detour or a spur of the moment errand. Upon cancellation, the driver may return to Block 215 at a later date when the route is traveled again in order to record the route.

A nametag may be assigned to the route if the driver indicates that the route should be saved (Block 245). The onboard digital signal processor may request a nametag for the route, for example by delivering the audible statement "Route nametag please." At this point the driver may assign the route a name, for example by saying "Home to work." The onboard digital signal processor may then deliver an audible response, for example "Route stored."

The onboard digital signal processor 122 may transmit the route and associated nametag to a central storage location (Block 250), which may be a communication services database 154 at a call center 150. This may be accomplished by the onboard digital signal processor initiating a call to a predetermined number through a wireless carrier system 120, perhaps also involving a communication network 125 and a land network 140, and delivering the information using a data transmission device 152. Routes that the subscriber traveled are recorded and placed in a data structure and linked to the subscriber's enrollment application stored in the communication services database 154 at call center 150. The linked route and subscriber enrollment application may be referred to as a subscriber, or user, profile.

The central location may then use this information to update a Web site 160 (Block 255). After transmission of the route to the website, the driver may view the route information, which may be overlaid on a map, at the Web site and determine whether it is correct (Block 260).

If the route information requires modification, the driver may modify the route information shown on the Web site using a personal computer 170 or any device through which the Web site may be accessed (Block 265). Once the subscriber has determined that the information contained for the route and the enrollment profile is accurate, the subscriber confirms the accuracy. In one embodiment, the subscriber clicks an "Enrollment Complete" icon present on the web site interface.

After receipt of a confirmation of the accuracy of the enrollment information system 100 generates a list of potential carpoolers (Block 275).

Using suitable software the database is searched for potential matches to the route and other criteria submitted by the subscriber. The software may begin the searching process by finding those other subscribers in the database that travel the same or nearly the same route. In one embodiment this is accomplished by comparing the recorded route nodes and vertices of one subscriber to those of another subscriber route to find compatible subscribers. For example, a first subscriber route having ten nodes is compared to a second subscriber route having nine nodes. Upon comparison of these two routes it is found that eight of the nodes are in common with both of the recorded routes. In this example, the second subscriber would be added to the list of potential subscribers to be sent to the subscriber seeking a carpooler. In one embodiment, the percentage of nodes that are in common with the subscriber's route may be a parameter taken into account when compiling the list of potential carpoolers. For example, a first subscriber may be willing to accept a list of carpoolers that have routes with eight often marching nodes but a second subscriber may only accept a list of carpoolers having all ten matching nodes.

After a list is generated containing subscribers with the same or similar routes, the system may next compare the enrollment applications of the list of subscribers. It is here that the system would take into account the preferences of the subscribers to generate the list to be sent to a particular subscriber. The list may include those other subscribers that do not fit a subscribers profile completely but may be within a certain degree of variance.

The degree of variance a particular subscriber is willing to accept as a potential carpooler may be a parameter submitted with the enrollment application. Those with skill in the art will recognize that there are many ways an enrollment application may be structured to elicit the amount of variance a subscriber is willing to accept. The final list to be transmitted may contain as little or as much information a subscriber is willing to have released. In one embodiment the list contains only the name and telephone number of the potential carpooler. In another embodiment the list may also include the e-mail address and/or home address. Those with skill in the art will recognize that this is another parameter that may be chosen at the time of enrollment.

Upon the completion of the searching, the list of potential carpoolers generated (Block 275) is transmitted to the website (Block 280). The driver may then retrieve the transmitted list from the website (Block 285). In one embodiment, the call center may notify the driver that a list has been generated and transmitted to the website. The driver may be notified by electronic mail or may be notified by an audible message sent to the vehicle and broadcast via the vehicle telematics unit. Once the list is retrieved, the subscriber may contact the individual(s) on the list.

Those with skill in the art will recognize that the carpool assistance service may also include those people without transportation looking for a driver to carpool. In this situation, the user would access the appropriate website to enroll into the carpool assistance service program and submit the completed enrollment form. This user would then be provided with a list of drivers that meet her criteria.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of providing car pooling assistance through a wireless communication system, the method comprising:
  receiving a first user carpool enrollment request
  obtaining the positional information of the first user's moving vehicle;
  storing the positional information as a route in a call center database;
  linking the first user's stored route to the received first user's carpool enrollment request to create a first user profile; and
  sending at least one available match based on the carpool enrollment request to the first user.

2. The method of claim 1 wherein obtaining the positional information of the moving vehicle comprises obtaining the positional information through a global positioning system.

3. The method of claim 1 further comprising:
recording the positional information obtained for the first user's moving vehicle; and
transmitting the recorded positional information from the first user's vehicle to the call center.

4. The method of claim 1 wherein the positional information further comprises time information.

5. The method of claim 1 further comprising comparing the first user profile to at least one subscriber profile to determine the at least one available match, the subscriber profile including at least a subscriber carpool enrollment request.

6. The method of claim 5 further comprising generating a list of at least one subscriber profile that matches the first user profile.

7. A computer usable medium including a program for providing car pooling assistance through a wireless communication system, the computer usable medium comprising:
computer program code for receiving a first user carpool enrollment request
computer program code for obtaining the positional information of the first user's moving vehicle;
computer program code for storing the positional information as a route in a call center database;
computer program coda for linking the first user's stored route to the received user's carpool enrollment request to create a first user profile; and
computer program code for sending at least one available match based on the carpool enrollment request to the user.

8. The computer usable medium of claim 7 wherein the computer program code for obtaining the positional information of the moving vehicle comprises computer program code for obtaining the positional information through a global positioning system.

9. The computer usable medium of claim 7 further comprising:
computer program code for recording the positional information obtained for the first user's moving vehicle; and
computer program code for transmitting the recorded positional information from the first user's vehicle to the call center.

10. The computer usable medium of claim 7 wherein the positional information further comprises time information.

11. The computer usable medium of claim 7 further comprising computer program code for comparing the first user profile to at least one subscriber profile to determine the at least one available match, the subscriber profile including at least a subscriber carpool enrollment request.

12. The computer usable medium of claim 11 further comprising computer program code for generating a list of at least one subscriber profile that matches the first user profile.

13. A system of providing car pooling assistance through a wireless communication system, the system comprising:
means for receiving a first user carpool enrollment request
means for obtaining the positional information of the first user's moving vehicle;
means for storing the positional information as a route in a call center database;
linking the first user's stored route to the received first user's carpool enrollment request to create a first user profile; and
means for sending at least one available match based on the carpool enrollment request to the first user.

14. The system of claim 13 wherein the means for obtaining the positional information of the moving vehicle comprises means for obtaining the positional information through a global positioning system.

15. The system of claim 13 further comprising:
means for recording the positional information obtained for the first user's moving vehicle; and
means for transmitting the recorded positional information from the first user's vehicle to the call center.

16. The system of claim 13 further comprising means for comparing the first user profile to at least one subscriber profile to determine the at least one available match, the subscriber profile including at least a subscriber carpool enrollment request.

17. The system of claim 16 further comprising means for generating a list of at least one subscriber profile that matches the first user profile.

18. A method for providing car pooling assistance through a wireless communication system, the method comprising:
receiving a first user carpool enrollment request;
obtaining a positional information for a first user moving vehicle;
associating the positional information of the first user moving vehicle with the first user carpool enrollment request;
receiving a plurality of additional user carpool enrollment requests
comparing the positional information associated with the first user carpool enrollment request wit the plurality of additional user carpool enrollment requests to determine a match; and
sending at least one match responsive to the first user carpool enrollment request based on the comparison.

* * * * *